United States Patent

Dong et al.

Patent Number: 5,958,356
Date of Patent: Sep. 28, 1999

[54] METHOD FOR REMOVAL OF MOISTURE FROM GASEOUS HCL

[75] Inventors: Chun Christine Dong, Macungie; Thomas Hsiao-Ling Hsiung, Emmaus; Timothy Christopher Golden, Allentown, all of Pa.

[73] Assignee: Air Products and Chemicals, Inc., Allentown, Pa.

[21] Appl. No.: 08/964,783

[22] Filed: Nov. 5, 1997

[51] Int. Cl.[6] ....................................................... C01B 7/07
[52] U.S. Cl. ............................... 423/488; 423/210; 95/117
[58] Field of Search ................................. 423/488, 210; 95/117

[56] References Cited

U.S. PATENT DOCUMENTS

| | | | |
|---|---|---|---|
| 2,196,246 | 4/1940 | Brown et al. | 423/488 |
| 4,853,148 | 8/1989 | Tom et al. | 252/194 |
| 4,925,646 | 5/1990 | Tom et al. | 423/488 |
| 5,202,106 | 4/1993 | Valautem | 423/488 |
| 5,539,998 | 7/1996 | Mostowy et al. | 34/343 |
| 5,766,565 | 6/1998 | Cronin et al. | 423/488 |

FOREIGN PATENT DOCUMENTS

| | | | |
|---|---|---|---|
| 215064 | 10/1984 | German Dem. Rep. | 423/488 |
| 5/13695 | 2/1993 | Japan . | |
| 1726368A1 | 4/1992 | U.S.S.R. . | |
| 2188043 | 9/1987 | United Kingdom | 423/488 |

*Primary Examiner*—Ngoc-Yen Nguyen
*Attorney, Agent, or Firm*—Geoffrey L. Chase

[57] ABSTRACT

An adsorbent and method for removing water from gaseous HCl. $MgCl_2$ supported on an activated carbon or silica gel substrate activated by heating to a temperature between 150° C. (302° F.) and 300° C. (572° F.) under vacuum will remove water at partial pressures of below 0.5 torr. Activation of the $MgCl_2$ supported adsorbent can also be effected by heating the adsorbent between 270° C. (518° F.) and 400° C. (752° F.) under nitrogen.

3 Claims, 4 Drawing Sheets

METHOD FOR REMOVAL OF MOISTURE FROM GASEOUS HCL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention pertains to removal of moisture or water vapor from gaseous hydrogen chloride (HCl).

Gaseous hydrogen chloride is one of the key specialty gases used in the manufacture of semi-conductor devices. HCl is used to grow silicon crystals (epitaxy) and is also used to etch silicon wafers in a dry etching process. For both of these applications high purity HCl is required. High purity HCl is generally taken to mean HCl free of water, or containing less than 0.5 ppm of water.

HCl containing water is highly corrosive and will present problems to the gas delivery system as well as adversely affecting production yields during the manufacture of semi-conductor devices.

For example water contained in hydrogen chloride gas will necessitate frequent replacement of piping, manifolds, valves and the like which are used to deliver the hydrogen chloride to the point of use in the semi-conductor manufacturing process. In cleaning susceptors which are the support structure on which wafers are processed, water contained in gaseous hydrogen chloride will result in a formation of a new oxide on the susceptor thus, frustrating the cleaning function of the hydrogen chloride. In etching applications, water contained in the hydrogen chloride becomes a source of undesirable contamination in a semi-conductor manufacturing environment, which may render chip products made in this environment less than efficient or totally useless for their intended purpose.

U.S. Pat. Nos. 4,853,148 and 4,925,646 disclose a number of adsorptive compositions and methods for removing water from HCl. Among the materials and processes suggested is adsorption using magnesium chloride ($MgCl_2$) supported on an alumina ($Al_2O_3$) substrate. However, it has been found that the use of $MgCl_2$ on $Al_2O_3$ for moisture removal from hydrogen chloride results in hydrogen chloride slowly reacting with the $Al_2O_3$ support to produce a volatile product, $AlCl_3$. The $AlCl_3$ will solidify at cool spots in the downstream process equipment resulting in deposits on the process equipment, such as regulators, filters and valves. This in turn causes system maintenance problems and eventually contamination of the HCl product.

Japanese Patent Application H5-13695 discloses removal of water from gaseous hydrogen chloride using a synthetic mordenite. However, it was found that the synthetic mordenite is not stable in gaseous hydrogen chloride.

Russian Patent 1726368 discloses removing water and oxygen from hydrogen chloride gas using iron chloride ($FeCl_2$) supported on a carbon substrate.

Prior art workers have also used silica gel to remove water from gaseous hydrogen chloride. However, although silica gel and $FeCl_2$ on carbon are stable in hydrogen chloride their water adsorption capacities are relatively low so that these materials must be changed more frequently when used in a HCl purification system.

BRIEF SUMMARY OF THE INVENTION

The present invention results from the discovery that an adsorbent comprising between 5 and 15 percent by weight $MgCl_2$ on a support selected from the group consisting of activated carbon and silica gel can be used to remove water from gaseous hydrogen chloride, especially at partial pressures of water in the HCl to be purified in the range of 0.01 to 0.5 torr. The supported $MgCl_2$ is activated at a temperature between 150° C. (302° F.) and 300° C. (572° F.) in vacuum. A preferred composition of the invention and the method of the invention is preparing and using 10 percent $MgCl_2$ on an activated carbon support.

In one aspect, the invention is defined as an adsorbent for removal of moisture from gaseous HCl comprising 5 to 15% by weight $MgCl_2$ on a solid support having a high resistance to reaction with HCl and high surface area. For the purposes of the present invention high surface area is taken to mean 300 to 2500 $m^2/g$ in a broad range and 700 to 1200 $m^2/g$ in a more narrow range.

In another aspect the invention is a method of removing water from gaseous HCl wherein the water in the HCl is at a partial pressure of between 0.03 to 0.5 torr by passing the HCl stream containing water over an adsorbent consisting of between 5 to 15% by weight $MgCl_2$ supported on an activated carbon substrate.

DETAILED DESCRIPTION OF THE INVENTION

In order to utilize hydrogen chloride gas in the manufacture of semi-conductor devices it is essential that the hydrogen chloride contain low amounts of retained water vapor or moisture, i.e. less than 0.5 ppm water.

Currently manufacturers are using $MgCl_2$ on an $Al_2O_3$ support, synthetic mordenite, silica gel, and $FeCl_2$ on activated carbon to try and obtain gaseous hydrogen chloride with low water content. It has been discovered that both the $MgCl_2$ on an $Al_2O_3$ material support and mordenite are not stable in HCl. HCl can react with the $Al_2O_3$ (also present in mordenite) to form volatile $AlCl_3$, which will deposit on downstream components of the process equipment and cause operational problems for the semiconductor manufacturer. Although silica gel and $FeCl_2$ on carbon are stable in an HCl environment found in semi-conductor manufacturing processes, the water adsorption capacities are relatively low so that a more frequent change of the purifier material is necessary.

According to the present invention adsorbents that are effective to remove water to the desired level from hydrogen chloride gas must be contained on a support that will be resistant to attack by the HCl and be capable of supporting a metal chloride.

Figure 1:
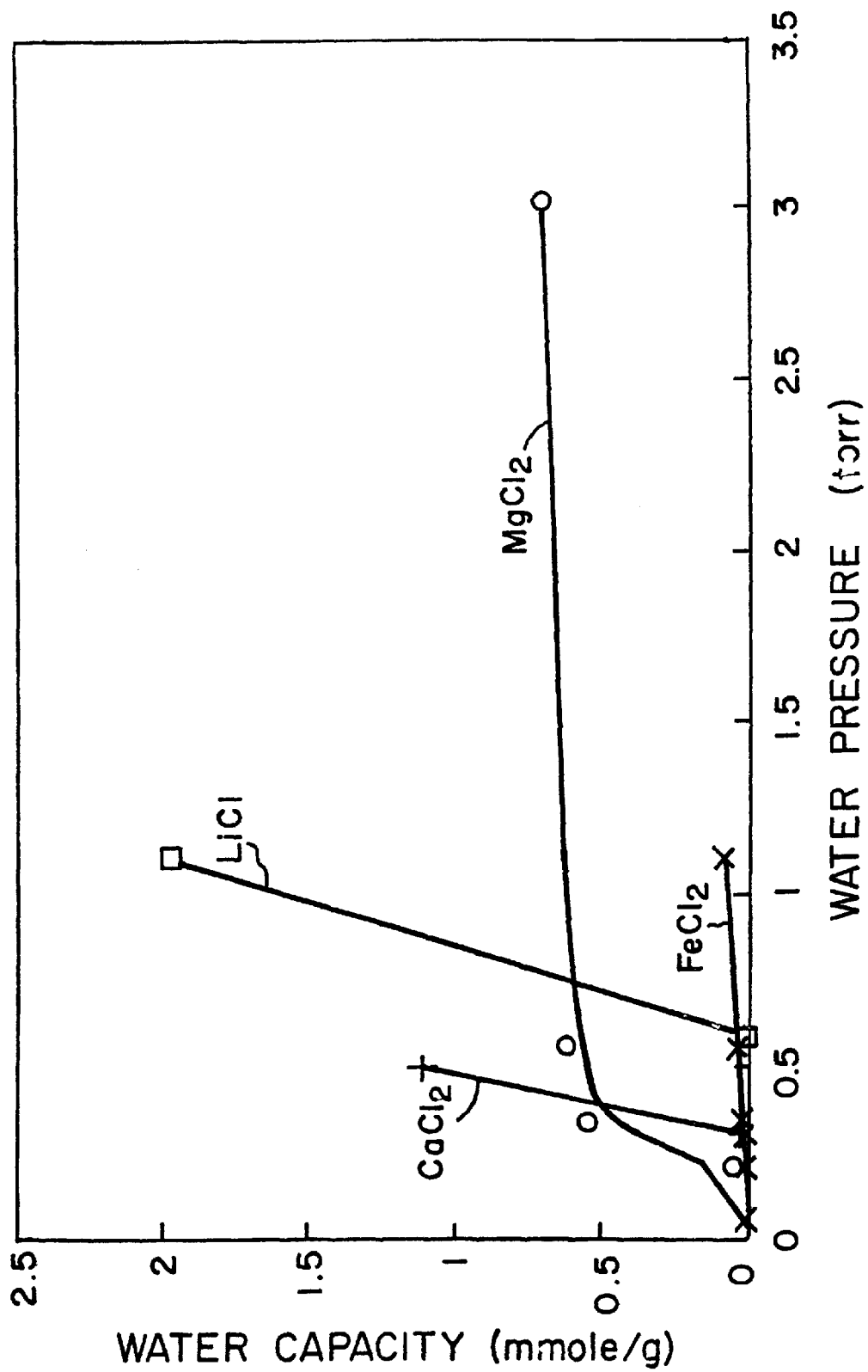
FIG. 1 is a plot of water capacity against water partial pressure for selected metal chlorides.

As a first step $MgCl_2$, $CaCl_2$, LiCl and $FeCl_2$ were selected as potential candidates for the metal chloride. FIG. 1 illustrates the water capacities for these chlorides at water partial pressure up to 3 torr. Of these $MgCl_2$ was selected as having the highest water capacity especially at water pressures below 0.3 torr and thus was considered for deposition on a carbon substrate and a silica gel substrate, both known to be resistant to attack by HCl.

A number of materials were screened for use as a substrate by testing in a liquid HCl solution and pure water. Each candidate was tested by dropping a sample in a solution of 38% HCl in water and a bath of pure water in order to distinguish reactions caused by HCl from reactions caused by water. The HCl solution and water bath with the samples were maintained at 25° C. for 24 hours to observe if there was a color change, break or dissolution. Table 1 summarizes the results of the screening.

TABLE 1

| Material | Stability in 38% HCl solution | Stability in $H_2O$ | Screening |
|---|---|---|---|
| silicalite | stable | stable | pass |
| mordenite | not stable | stable | fail |
| silica gel | not stable | not stable | pass |
| 3A CMS[1] | stable | stable | pass |
| calcium chabazite | not stable | stable | fail |
| 3A zeolite | not stable | stable | fail |
| 4A zeolite | not stable | stable | fail |
| $K_2CO_3$ on $Al_2O_3$ | not stable | stable | fail |
| CaO | not stable | relative stable | fail |
| Potassium X zeolite | not stable | stable | fail |
| Alcoa Selexsorb[2] | not stable | stable | fail |
| ZSM-5[2] | not stable | stable | fail |
| AW-500[3] | not stable | stable | fail |

[1]Carbon Molecular sieve
[2]Zeolite
[3]Alumina silicate

The silicalite, silica gel, and carbon molecular sieve samples were all judged to be acceptable for supporting the $MgCl_2$ even though the silica gel by itself was not stable in either the 38% HCl solution or pure water over the test period. The instability of the silica gel is caused by the swelling effect of the material in the presence of water and not caused by reaction with HCl.

Several compositions were prepared by depositing $MgCl_2$ on activated carbon and silica gel substrates. The solid support was selected to have a high surface area. In the context of the present invention the surface area should broadly be within the range of 300 to 2500 $m^2/g$ and narrowly within the range of 700 to 1200 $m^2/g$. The activated carbon was obtained from Calgon Corp. and identified as type PSC. The silica gel was obtained from Davison Chemical Company and identified as Grade 55. $MgCl_2$ was deposited or placed on the substrate by the well known incipient wetness technique.

Figure 2:
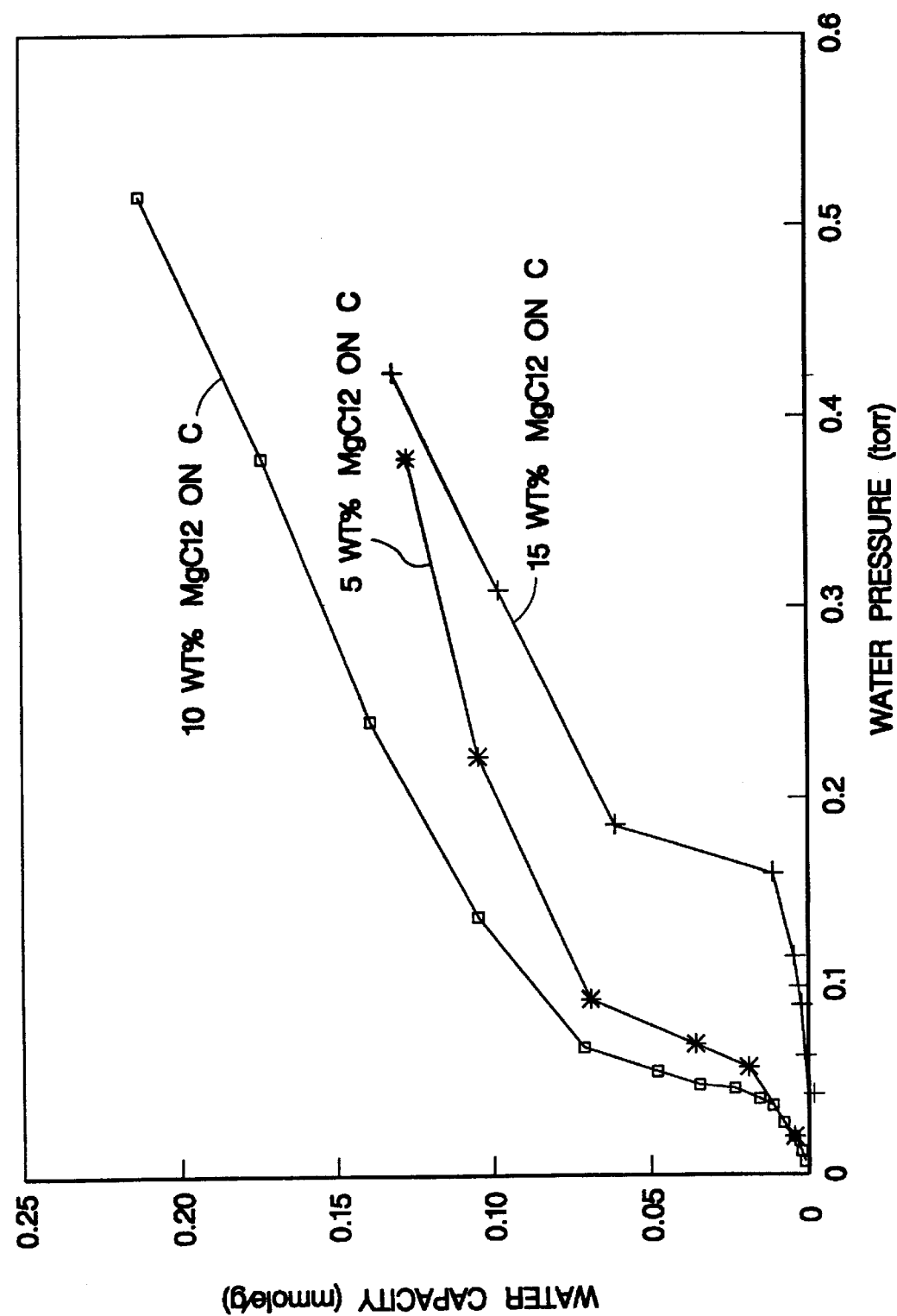
FIG. 2 is a plot of water capacity against water pressure for several adsorbent compositions according to the invention.

As shown in FIG. 2, between 5 and 15 weight percent $MgCl_2$ deposited on a carbon substrate results in an effective adsorbent for removal of water from gaseous HCl, especially at water partial pressures in the HCl of from 0.01 to 0.5 torr. The preferred composition of the present invention shows the highest water capacity in the range of water pressure for 0.03 to 0.3 torr.

Figure 3:
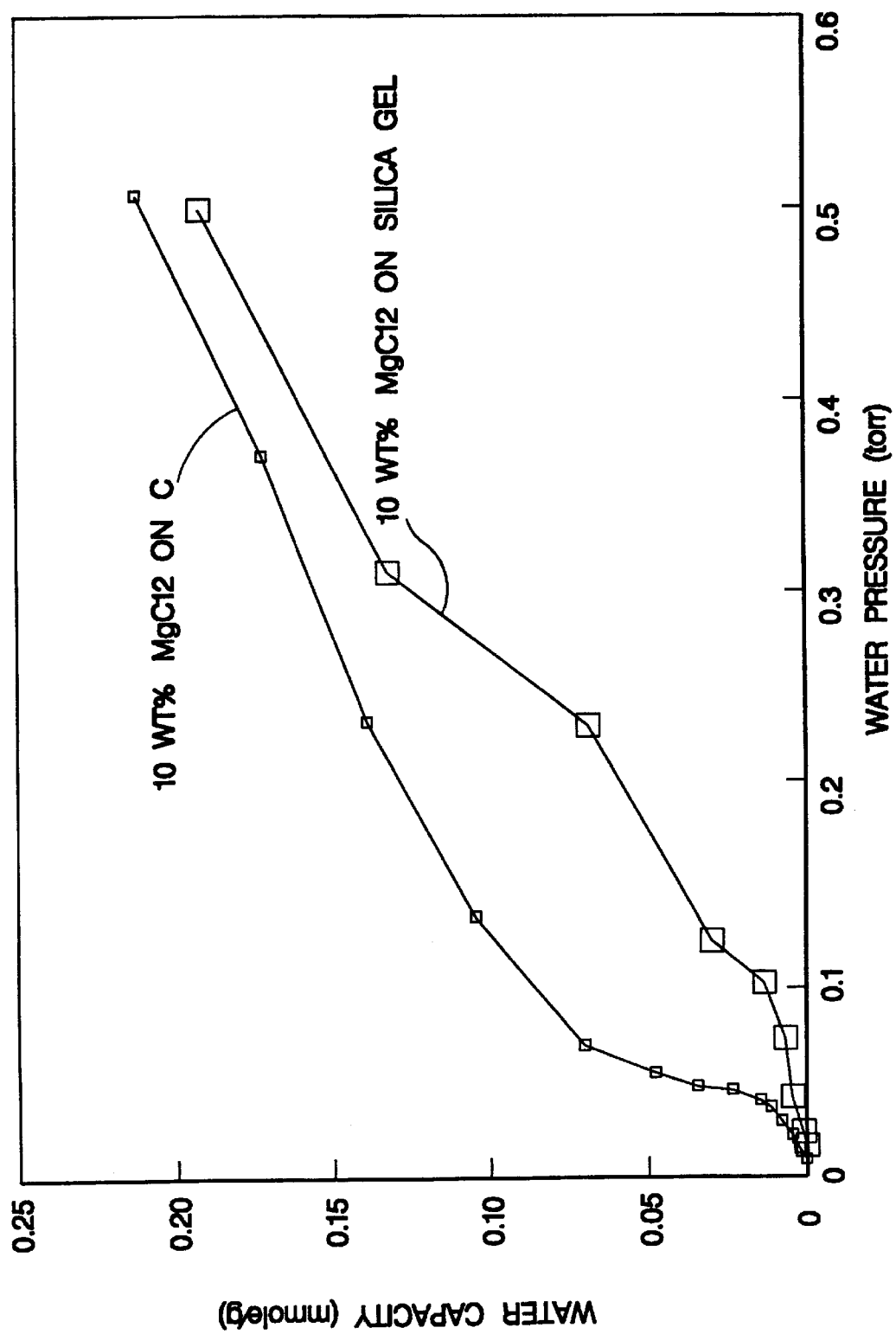
FIG. 3 is a plot of water capacity against water pressure for a preferred composition of the invention supported on activated carbon and silica gel.

FIG. 3 is a plot of water capacity in m mol/g against water pressure (torr) for an adsorbent consisting of 10% $MgCl_2$ supported on a carbon and a silica gel substrate. These are effective compositions for removing the water from the gaseous hydrogen chloride, especially at water partial pressures of between 0.032 and 0.32 torr. The carbon supported $MgCl_2$ material shows a higher water capacity, as shown in FIG. 3.

The materials used to derive the data plotted in FIGS. 2 and 3 were activated at 100° C. (212° F.) under vacuum. The graphs show the preferred $MgCl_2$ loading and the preferred solid support according to the invention. Additional studies were conducted to determine the preferred activation temperature. The best adsorption isotherm was obtained for 10% $MgCl_2$ on activated carbon activated at 200° C. (392° F.) in vacuum.

Figure 4:
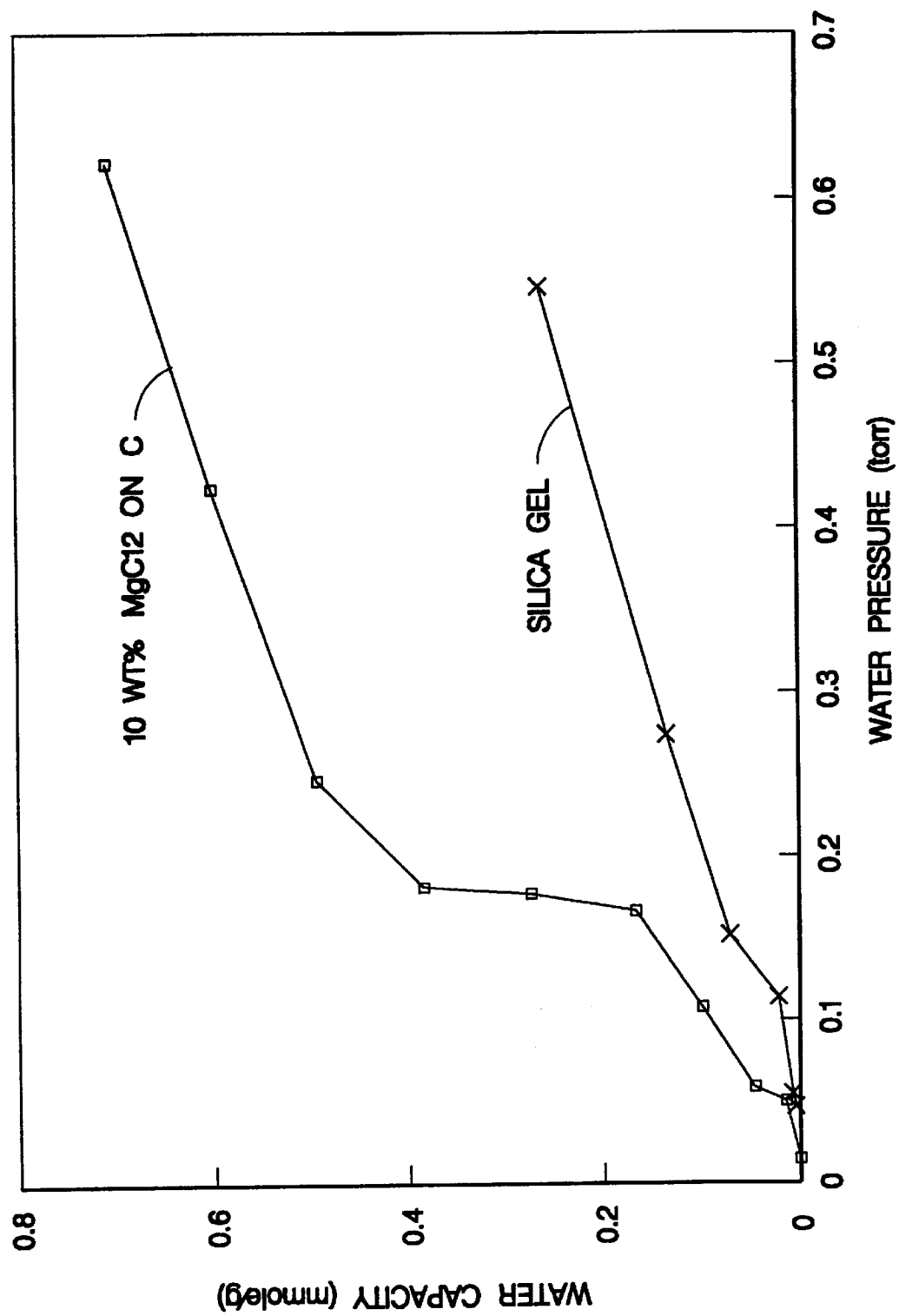
FIG. 4 is a plot of capacity against water pressure for a preferred composition according to the invention activated at 200° C. (392° F.) in vacuum, compared to silica gel.

FIG. 4 is a plot of water capacity (m mol/g) against water pressure (torr) for the preferred composition of the invention activated at a temperature 200° C. (392° F.) under vacuum compared to silica gel as an adsorbent. Over the range of water partial pressures of 0.032 to 0.32 torr the preferred composition ($MgCl_2$ on carbon) according to the invention is more effective than silica gel for removal of water from gaseous HCl It has also been determined by Thermal Gravimetric Analysis that unsupported $MgCl_2$ could be activated by heating in nitrogen to temperatures between 270° C. (518° F.) and 400° C. (752° F.).

Having thus described our invention what is desired to be secured by letters of patent of the United States includes all modifications within the spirit and scope of the appended claims.

We claim:

1. A method of removing water from gaseous HCl wherein the water contained in the HCl is at a partial pressure of between 0.01 to 0.5 torr by passing the HCl stream containing water over an adsorbent consisting of between 5 to 15% by weight $MgCl_2$ supported on an activated carbon substrate.

2. A method according to claim 1 including the step of activating said adsorbent by heating to a temperature of 200° C. (392° F.) under vacuum prior to passing said HCl stream containing water over said adsorbent.

3. A method according to claim 1 wherein 10% by weight $MgCl_2$ is present on said activated carbon.

* * * * *